(12) United States Patent
Yoon et al.

(10) Patent No.: US 6,278,759 B1
(45) Date of Patent: Aug. 21, 2001

(54) SPACER GRID WITH MULTI-SPRINGS AND DIMPLE VANES FOR NUCLEAR FUEL ASSEMBLIES

(75) Inventors: Kyungho Yoon; Heungseok Kang; Keenam Song; Youn Ho Jung; Taehyun Chun; Dongseok Oh; Wangkee In, all of Taejon-si (KR)

(73) Assignees: Korea Atomic Energy Research Institute, Taejon-si; Korea Electric Power Corporation, Seoul, both of (KR)

( * ) Notice: Subject to any disclaimer, the term of this patent is extended or adjusted under 35 U.S.C. 154(b) by 0 days.

(21) Appl. No.: 09/558,043

(22) Filed: Apr. 26, 2000

(30) Foreign Application Priority Data

Jul. 29, 1999 (KR) .................................................. 99-31120

(51) Int. Cl.[7] ....................................................... G21C 3/34
(52) U.S. Cl. ............................ 376/462; 376/439; 376/442
(58) Field of Search .................................. 376/439, 441, 376/442, 462

(56) References Cited

U.S. PATENT DOCUMENTS

| 3,654,077 | * | 4/1972 | Lass et al. ............................. 376/442 |
| 3,933,584 | * | 1/1976 | Litt ........................................ 376/439 |
| 4,224,107 | | 9/1980 | Delafosse et al. . |
| 4,702,881 | | 10/1987 | Weiland et al. . |
| 4,756,878 | * | 7/1988 | King et al. ............................ 376/441 |
| 4,775,510 | * | 10/1988 | Bryan .................................... 376/439 |
| 4,923,669 | * | 5/1990 | DeMario ............................... 376/442 |
| 5,183,629 | * | 2/1993 | Canat et al. .......................... 376/439 |
| 5,444,748 | | 8/1995 | Beuchel et al. . |
| 5,732,116 | * | 3/1998 | Petit ....................................... 376/441 |
| 6,130,927 | * | 10/2000 | Kang et al. ........................... 376/439 |

\* cited by examiner

*Primary Examiner*—Harvey E. Behrend
(74) *Attorney, Agent, or Firm*—Bachman & LaPointe, P.C.

(57) ABSTRACT

A nuclear fuel spacer grid, fabricated by intersecting a plurality of grid strips and used for placing and supporting a plurality of elongated fuel rods within a nuclear fuel assembly, is disclosed. The spacer grid of this invention has a plurality of dimple vanes on its grid strips. The dimple vanes are designed to guide the coolant from one cell to neighboring cells of the spacer grid, thus accomplishing a desired coolant mixing effect and increasing the thermal allowance of the fuel rods and accomplishing a high performance fuel assembly. The spacer grid also has a multi-spring structure, consist in of one arc-shaped main spring and two bow-shaped sub-springs. The main spring directly supports the fuel rod within the spacer grid, while the sub-springs have the same radius of curvature as that of the external surface of the fuel rod and effectively support the fuel rod when the main spring fails to support the fuel rod. The spacer grid of this invention thus accomplishes desired soundness of the fuel rods within the fuel assembly during an expected life span of the fuel rods.

6 Claims, 11 Drawing Sheets

SPACER GRID WITH MULTI-SPRINGS AND DIMPLE VANES FOR NUCLEAR FUEL ASSEMBLIES

BACKGROUND OF THE INVENTION

1. Field of the Invention

The present invention relates, in general, to a spacer grid used for placing and supporting a plurality of fuel rods within a nuclear fuel assembly of a light water reactor and, more particularly, to a nuclear fuel spacer grid having both a plurality of arc-shaped main springs and a plurality of bow-shaped sub-springs on its grid strips. The sub-springs having the same radius of curvature as that of the external surface of each fuel rod and effectively supporting the fuel rods when the main springs fail to support the fuel rods, thus accomplishing desired soundness of the fuel rods within the fuel assembly during an expected life span of the rods, the spacer grid also having a plurality of dimple vanes on the grid strips, the dimple vanes being oppositely embossed in an axial direction of the fuel assembly so as to guide the coolant from one cell to neighboring cells of the spacer grid, thus accomplishing a desired coolant mixing effect without creating an excessive pressure drop within the fuel assembly.

2. Description of the Prior Art

Figure 1:
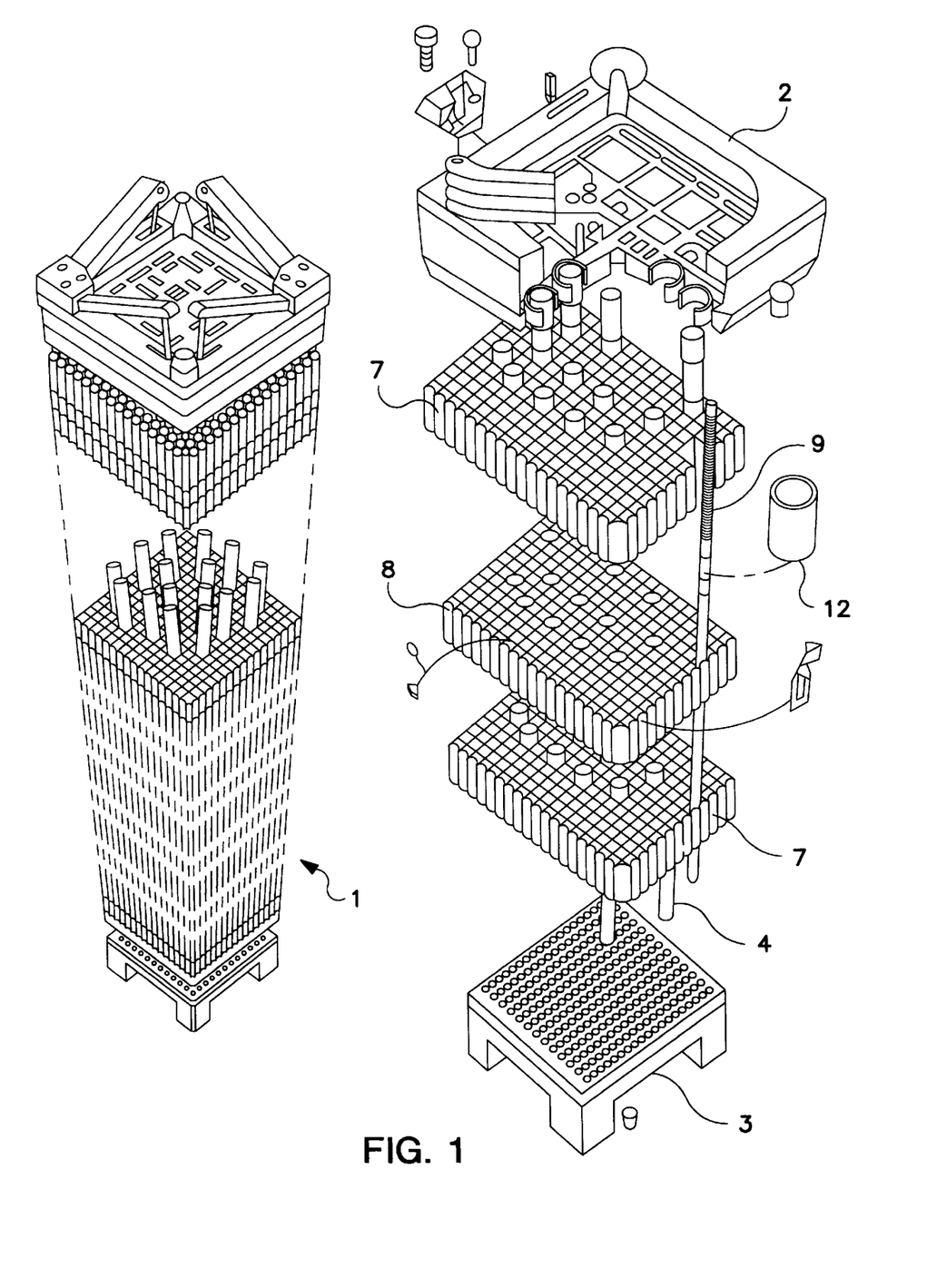
FIG. 1 is a partially exploded perspective view, showing the construction of a conventional nuclear fuel assembly.

In a conventional light water reactor, a plurality of elongated nuclear fuel rods 9 are regularly and parallelly arranged in an assembly 1 having a square cross-section in a way such that, for example, fourteen, fifteen, sixteen or seventeen fuel rods 9 are regularly arranged along each side of the square cross-section, thus forming a 14×14, 15×15, 16×16, or 17×17 array as shown in FIG. 1. In such a nuclear fuel assembly 1, the elongated fuel rods 9 are placed and supported by a plurality of spacer grids 7 and 8. Each of the fuel rods 9 is typically fabricated by containing a fissionable fuel material, or a uranium core 12, within a hermetically sealed elongated zircaloy tube known as the cladding. The above spacer grids 7 and 8 are individually produced by welding a plurality of intersecting grid strips to each other into an egg-crate pattern prior to encircling the periphery of each grid 7, 8 by four perimeter strips. The top and bottom of the fuel assembly 1 are, thereafter, covered with pallets 2 and 3, respectively, and so the assembly 1 is protected from any external loads acting on its top and bottom. The spacer grids 7 and 8 and the pallets 2 and 3 are also integrated into a single structure using a plurality of guide tubes 4. A framework of the fuel assembly 1 is thus fabricated.

In order to provide a high performance nuclear fuel assembly, it is necessary to effectively remove heat from the fuel rods within the assembly. In the prior art, such a removal of heat from the fuel rods is accomplished by making the temperature of coolant flowing around the fuel rods uniformed by mixing the coolant within the fuel assembly. This finally allows the fuel assembly to be free from a partial overheat. In order to mix the coolant within the fuel assembly in the prior art, two structures have been used as follows. In a first structure, a plurality of coolant mixing vanes are attached to the upper portion of each spacer grid, thus creating a turbulent flow or a swirling flow in the coolant passing through each spacer grid and finally mixing the coolant within the fuel assembly. In a second structure, a plurality of coolant mixing ducts are formed within each spacer grid so as to allow the coolant to be mixed together between neighboring cells while flowing upwardly within each spacer grid.

The coolant mixing vanes of the first structure are inclined relative to the coolant flowing direction at a predetermined angle so as to maximize the coolant mixing effect in addition to reducing pressure drop. However, the conventional coolant mixing vanes increase the turbulent flow, thus undesirably resulting in an increase in pressure drop. In addition, the above coolant mixing vanes allow the fuel rods to be vibrated within the spacer grid, thus undesirably abrading the external surfaces of the fuel rods.

On the other hand, the coolant mixing ducts of the second structure are formed by integrating two grid strips into a single body, with each strip having a coolant mixing channel. In this structure, each duct is arrayed in an axial direction of the fuel assembly at its inlet end, but is bent at its outlet end so as to be inclined relative to the axial direction of the fuel assembly. Therefore, the ducts guide the coolant from one cell into neighboring cells and accomplish a coolant mixing effect within the fuel assembly. However, this structure uses two strips, thus reducing the coolant flowing area and increasing the pressure drop within each spacer grid. In addition, the ratio of the coolant flowing area to the coolant contact length within each duct is higher than that of the coolant flowing passage outside the duct, and so the duct creates a high resistance to the coolant flow. This structure thus finally reduces the coolant flowing velocity within the ducts, and so the structure may fail to accomplish a desired coolant mixing effect.

SUMMARY OF THE INVENTION

Accordingly, the present invention has been made keeping in mind the above problems occurring in the prior art, and an object of the present invention is to provide a spacer grid for nuclear fuel assemblies, which has a plurality of dimple vanes on its grid strips, with the dimple vanes being designed to guide the coolant from one cell to neighboring cells, thus accomplishing a desired coolant mixing effect and increasing the thermal allowance of the fuel rods and accomplishing a high performance fuel assembly, and which has a multi-spring structure, consisting of one arc-shaped main spring and two bow-shaped sub-springs, with the sub-springs having the same radius of curvature as that of the external surface of each fuel rod and effectively supporting the fuel rod when the main spring fails to support the fuel rod, thus accomplishing desired soundness of the fuel rods within the fuel assembly during an expected life span of the fuel rods.

In order to accomplish the above objects, the present invention provides a nuclear fuel spacer grid fabricated by intersecting a plurality of grid strips and used for placing and supporting a plurality of elongated fuel rods at multi-points within a nuclear fuel assembly, comprising: two dimple vanes formed on each of the grid strips at a position corresponding to each sidewall of a unit cell of the spacer grid, the two dimple vanes being oppositely embossed in an axial direction of the fuel assembly so as to accomplish a coolant mixing effect within the spacer grid; two main springs provided on each of the grid strips at respective positions above and under the two dimple vanes, the main springs having an arcuate shape suitable for elastically supporting an elongated fuel rod within the unit cell; and two sub-springs provided on each of the grid strips at positions above and under each of the main springs, the sub-springs having a bow shape suitable for supporting the fuel rod while reducing a maximum load applied to the fuel rod within the unit cell.

In the above spacer grid, each of the two dimple vanes has a streamline profile suitable for diverging the coolant flowing within the spacer grid in the axial direction, thus allowing the coolant to be mix together while flowing within the spacer grid. The two dimple vanes, formed on a sidewall of the unit cell, are opposite in their embossed directions to dimple vanes formed on neighboring sidewalls of the unit cell, thus allowing the coolant to be mixed together and to swirl within the spacer grid. The dimple vanes are also positioned on a reference surface at which the grid strip is cut at a predetermined angle so as to reduce a pressure drop.

In addition, the main springs and the sub-springs form a multi-spring structure, of which the main springs, having the arcuate shape, directly support the fuel rod, and the sub-springs, having the bow shape, support the fuel rod when the main springs fail to support the fuel rod. The main springs and the sub-springs have a limited number of angled portions, thus being reduced in residual stress at the angled portions. The above main springs and the sub-springs are also inclined at a desired angle of inclination relative to the grid strip, thus reducing a coolant intercepting area at the same height within the spacer grid and reducing a pressure drop within the spacer grid.

The main springs, the sub-springs and the dimple vanes are appropriately machined at their edges so as to be free from damaging the fuel rods when the fuel rods are inserted into or removed from the spacer grid.

BRIEF DESCRIPTION OF THE DRAWINGS

The above and other objects, features and other advantages of the present invention will be more clearly understood from the following detailed description taken in conjunction with the accompanying drawings, in which:

FIG. 7b is a perspective view of the unit cell of FIG. 7a;

FIG. 7c is an elevational view of the unit cell of FIG. 7a;

FIG. 12b is an elevational view of the spacer grid of FIG. 12a.

DESCRIPTION OF THE PREFERRED EMBODIMENTS

Figure 2:
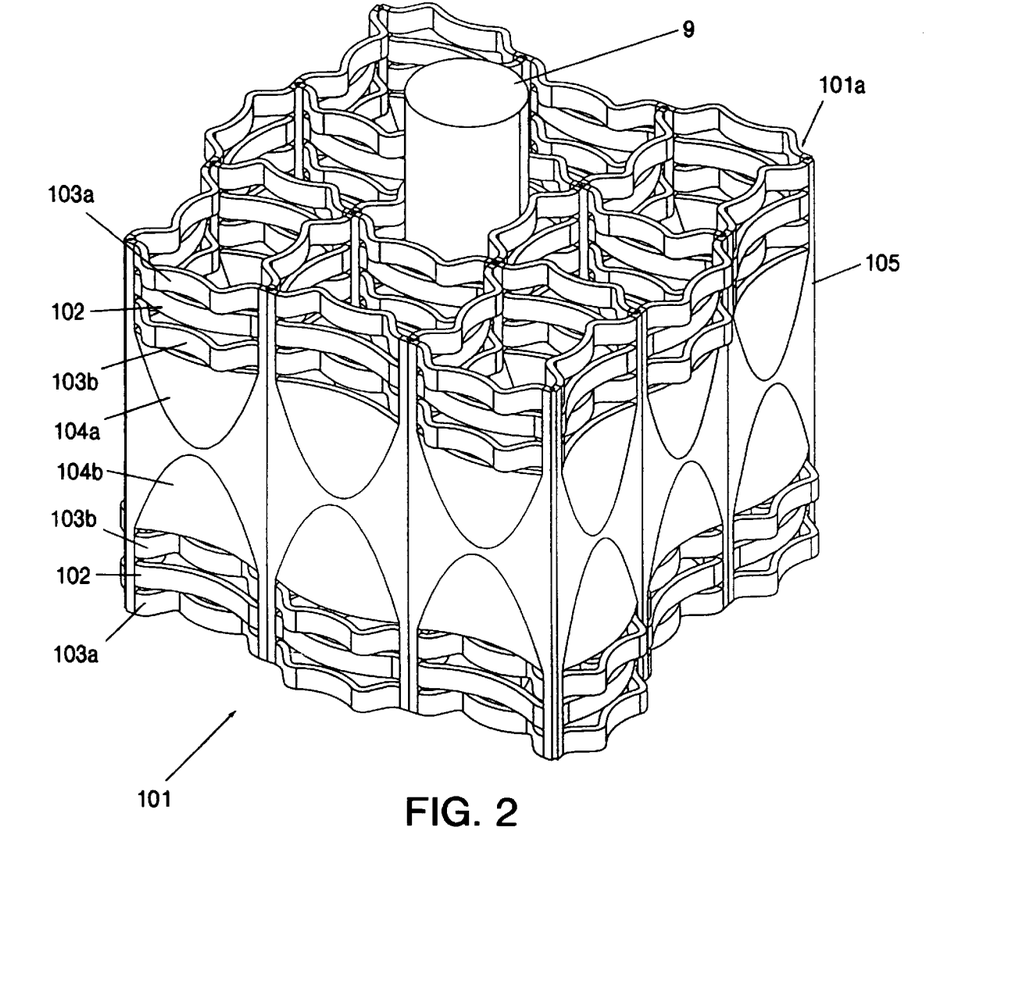
FIG. 2 is a perspective view, showing the construction of a spacer grid used for placing and supporting a plurality of elongated fuel rods within a nuclear fuel assembly in accordance with the primary embodiment of the present invention.
Figure 3:
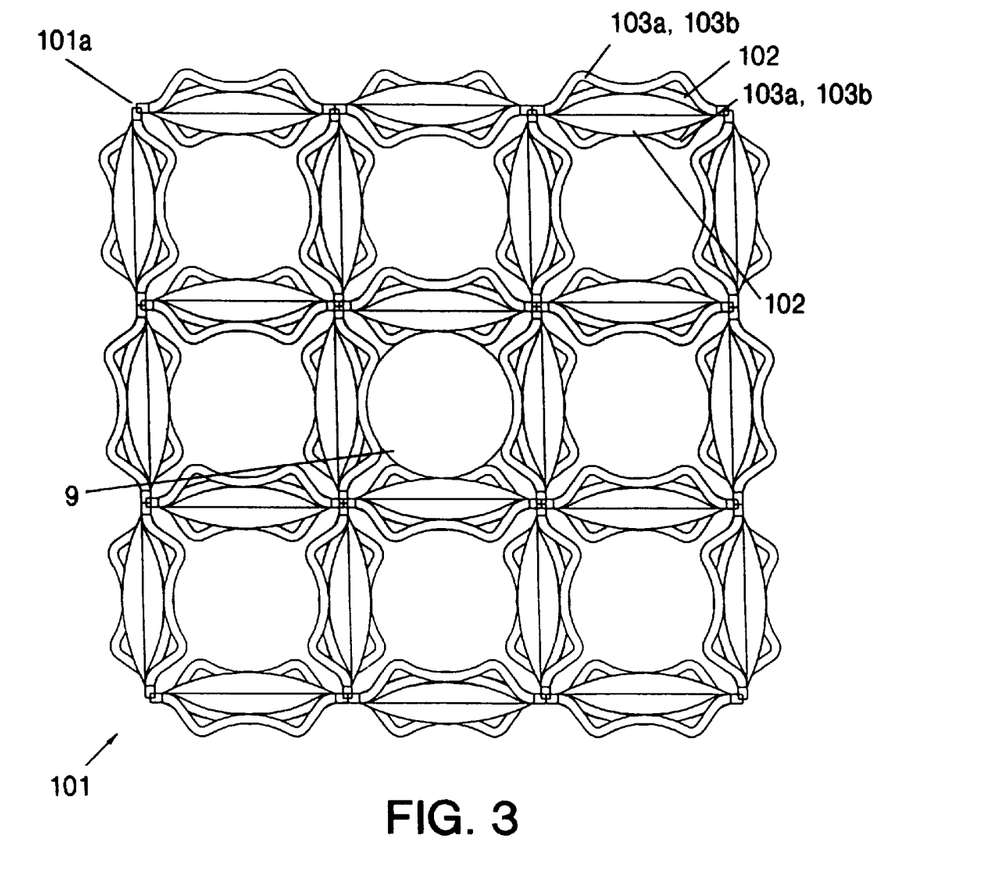
FIG. 3 is a plan view of the spacer grid according to this invention, the spacer grid having a plurality of dimple vanes used for mixing the coolant within the spacer grid and multi-springs used for supporting the fuel rods within the spacer grid.
Figure 4:
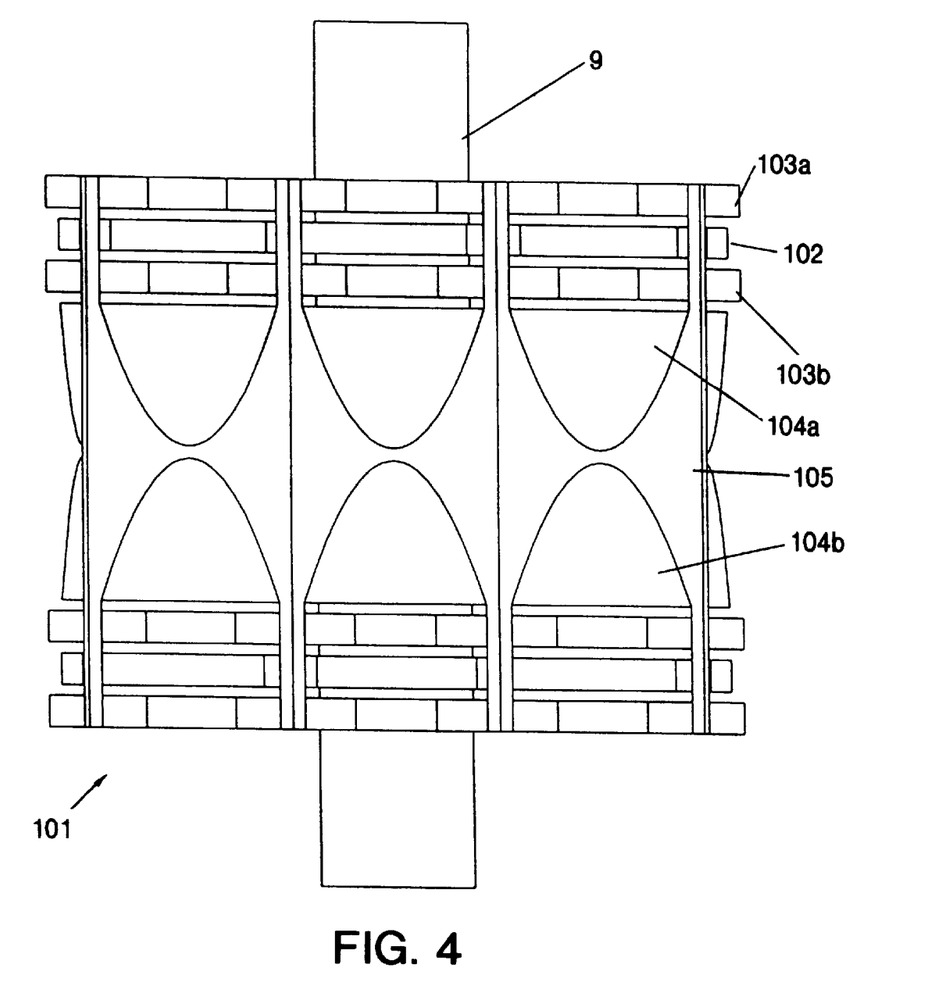
FIG. 4 is an elevational view of the spacer grid according to this invention.

FIGS. 2 to 4 show a spacer grid 101 for nuclear fuel assemblies in accordance with the primary embodiment of the present invention. As shown in FIG. 1, the spacer grid 101 of this invention places and supports a plurality of elongated fuel rods 9 within a nuclear fuel assembly 1. Within the nuclear fuel assembly 1, two dimple vanes 104a and 104b are embossed on each grid strip at a position corresponding to each sidewall of each unit cell 101a, thus effectively mixing the coolant within the spacer grid 101. A plurality of multisprings 102, 103a and 103b are attached to the sidewalls of the unit cell 101a at positions above and under the dimple vanes 104a and 104b, thus supporting one fuel rod 9 within a unit cell 101a at multi-points.

The two dimple vanes 104a and 104b, formed on each sidewall of each unit cell 101a, are oppositely embossed in an axial direction of the fuel assembly 1. The embossed directions of the two dimple vanes 104a and 104b, formed on each sidewall of each unit cell 101a, are opposite to those of two dimple vanes formed on the neighboring cells 101a, thus allowing the coolant to mix together between the cells 101a and to intersect within the spacer grid 101. Due to the vanes 104a and 104b, the coolant, flowing from the lower end of the spacer grid 101. is forcibly deflected to the corners of the unit cells 101a.

On the other hand, the multi-springs comprise a main spring 102 positioned at the center and two sub-springs 103a and 103b positioned above and under the main spring 102. The three springs 102, 103a and 103b are specifically designed to be embossed in directions opposite to those of the multi-springs formed on the neighboring cells 101a in the same manner as that described for the dimple vanes 104a and 104b. In addition, the above multi-springs 102, 103a and 103b of this invention may be inclined at a predetermined angle of inclination relative to the grid strip 105.

Figure 5A:
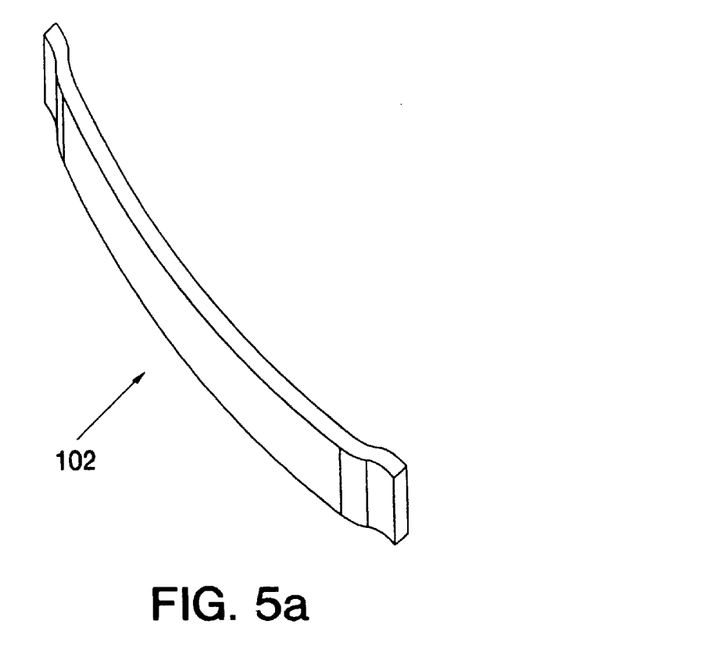
FIG. 5a is a perspective view of a main spring used for normally supporting an elongated fuel rod within the spacer grid of this invention.
Figure 5B:
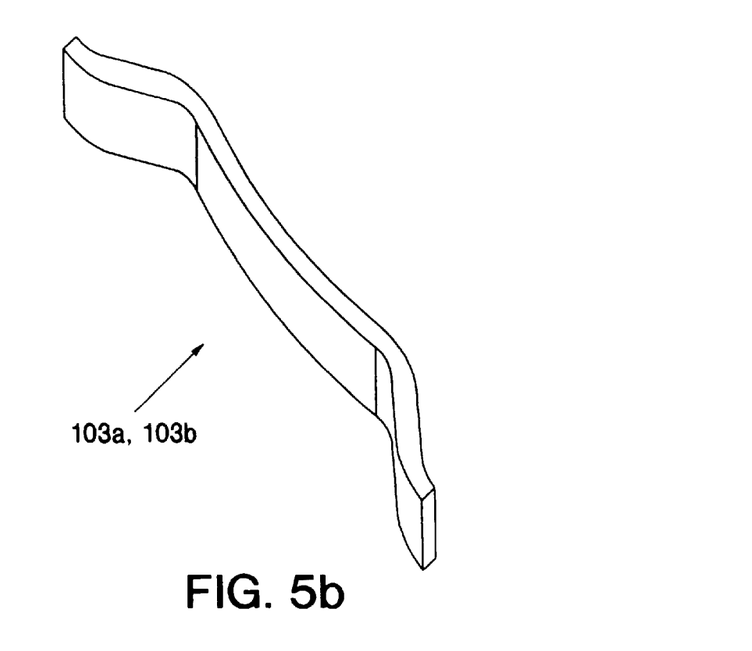
FIG. 5b is a perspective view of a sub-spring used for supporting the elongated fuel rod within the spacer grid of this invention when the main spring fails to effectively support the fuel rod.

FIGS. 5a and 5b are perspective views, respectively showing one main spring 102 and two sub-springs 103a and 103b forming the multi-springs of the spacer grid 101 according to this invention. As shown in FIG. 5a, the main spring 102, used for normally supporting the fuel rod 9 within the spacer grid 101, has an arc-shape. The two sub-springs 103a and 103b, used for supporting the fuel rod 9 when the main spring 102 fails to support the fuel rod 102, has a bow-shape suitable for reducing the maximum load applied to the fuel rod 9 as shown in FIG. 5b.

Figure 6:
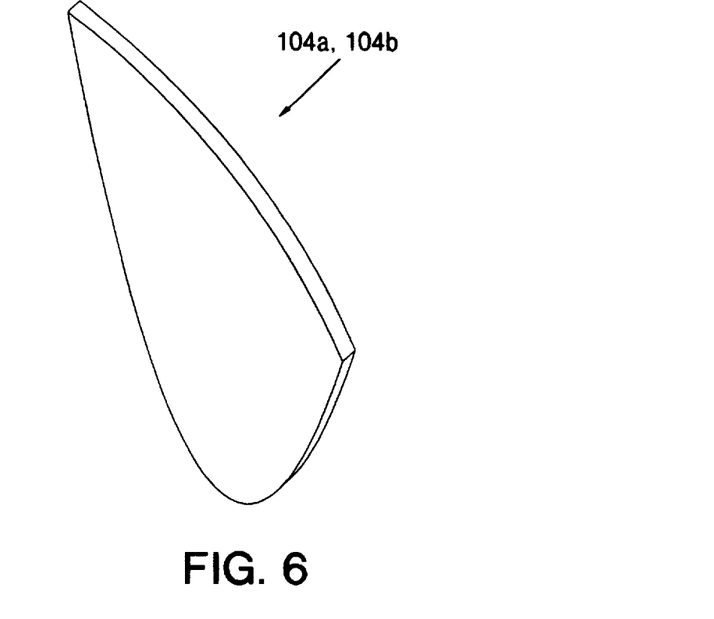
FIG. 6 is a perspective view of a dimple vane used for mixing the coolant within the spacer grid of this invention.

FIG. 6 is a perspective view of the dimple vanes 104a and 104b used for allowing the coolant to be mixed together and to intersect the grid strips within the spacer grid 101 of this invention. The dimple vanes 104a and 104b have a half-elliptic profile and are positioned to face each other at their apexes while being spaced apart from each other.

Figure 7A:
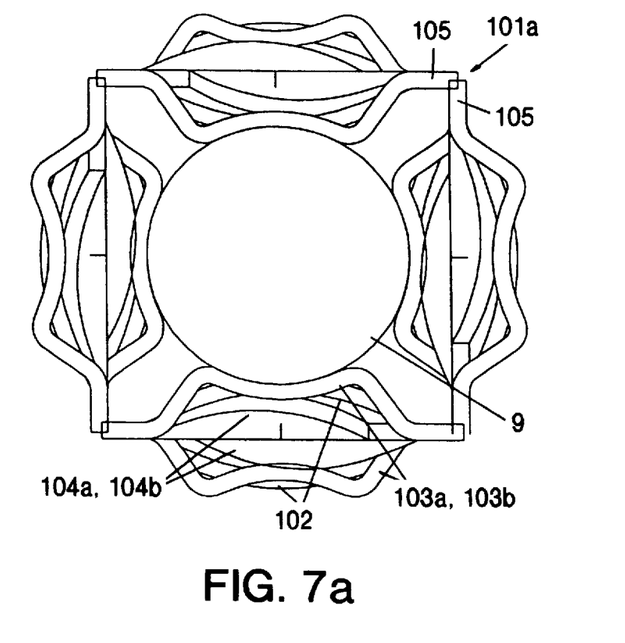
FIG. 7a is a plan view of a unit cell of the spacer grid according to this invention, showing the multi-springs consisting of the main and sub-springs and supporting a fuel rod within the unit cell.
Figure 7B:
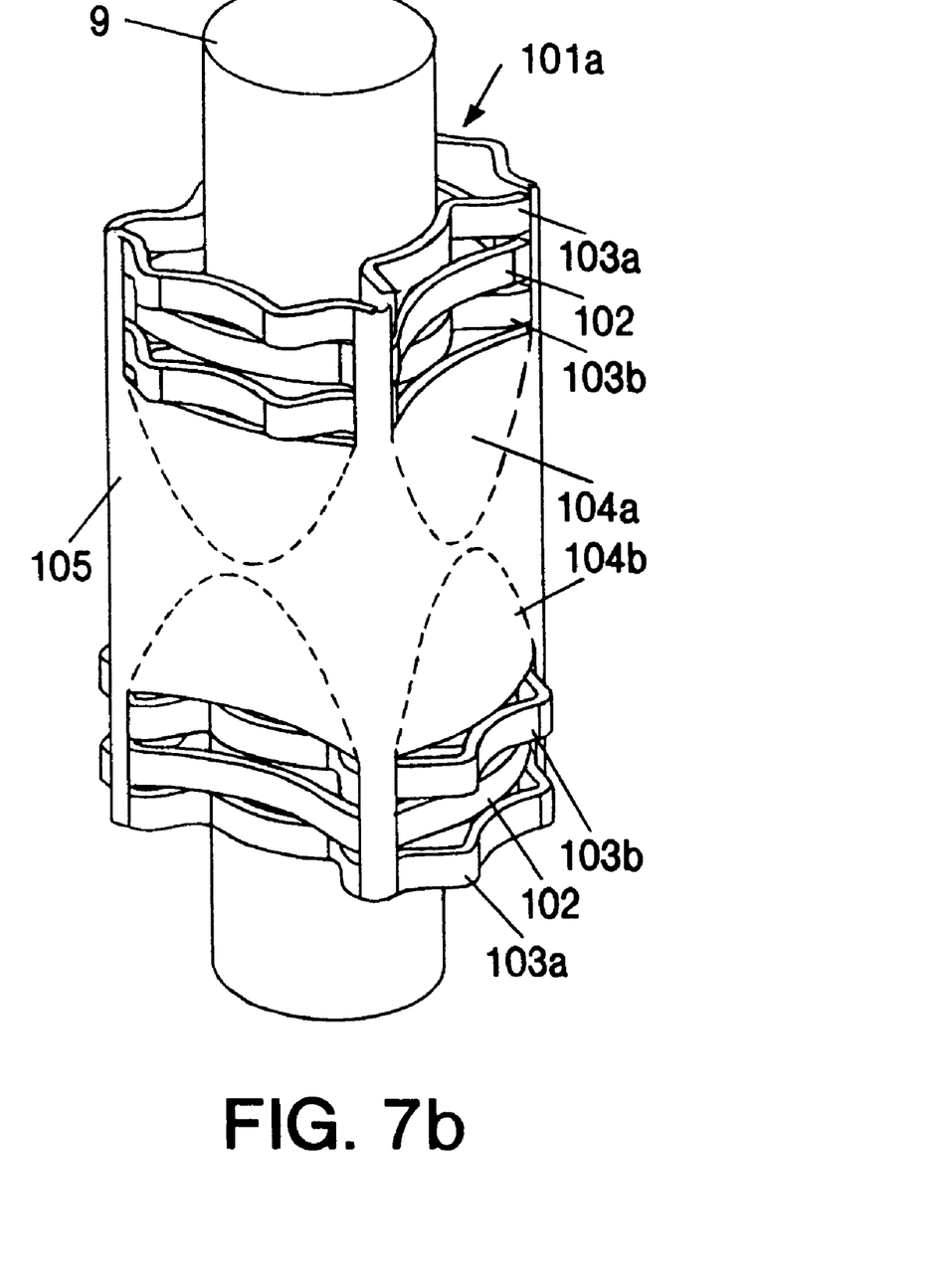
Figure 7C:
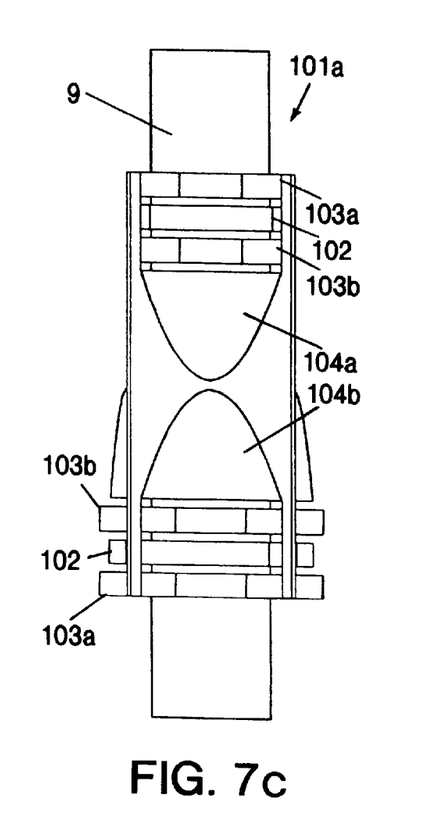

FIGS. 7a to 7c are views of a unit cell 101a of the spacer grid 101 according to this invention, with the multi-springs 102, 103a and 103b supporting a fuel rod 9 within the unit cell 101a and the dimple vanes 104a and 104b mixing the coolant flowing around the fuel rod 9 within the unit cell 101a.

Figure 7D:
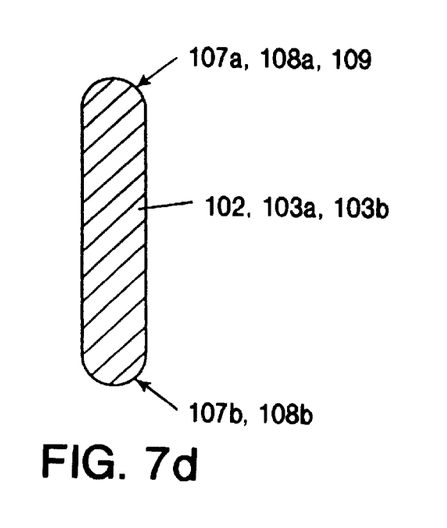
FIG. 7d is a side sectional view, showing the construction of the multi-springs of this invention.

FIG. 7d is a side sectional view, showing the construction of the multi-springs 102, 103a and 103b of this invention. As shown in the drawing, the upper and lower edges 107a, 107b, 108 and 109 of the multi-springs 102, 103a and 103b are appropriately rounded so as to be free from scratching the external surface of the fuel rod 9 when the fuel rod 9 is inserted into or removed from the unit cell 101a. In another embodiment, the edges 107a, 107b, 108 and 109 of the multi-springs 102, 103a and 103b may be angled in a direction opposite to the fuel rod 9, thus forming angled portions capable of allowing the edges 107a, 107b, 108 and 109 to be free from scratching the external surface of the fuel rod 9 when the fuel rod 9 is inserted into or removed from the unit cell 101a. In the same manner as that described for the multi-springs 102, 103a and 103b, the dimple vanes 104a and 104b have rounded or angled edges 107a, 107b, 108 and 109.

Figure 8:
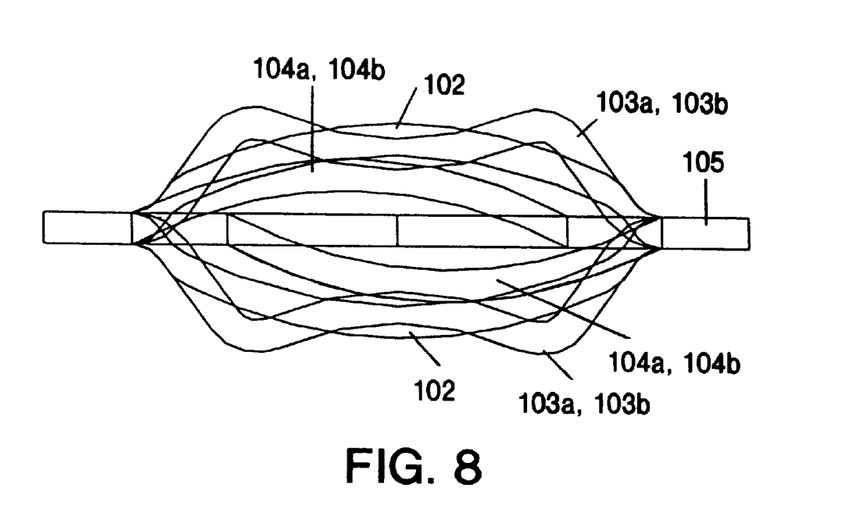
FIG. 8 is a plan view of a grid strip having the dimple vanes and the multi-springs of this invention.

FIG. 8 is a plan view of a grid strip 105 having the dimple vanes 104a and 104b and the multi-springs 102, 103a and 103b according to the invention. As shown in the drawing, the dimple vanes 104a and 104b and the multi-springs 102, 103a and 103b are embossed in opposite directions.

Figure 9:
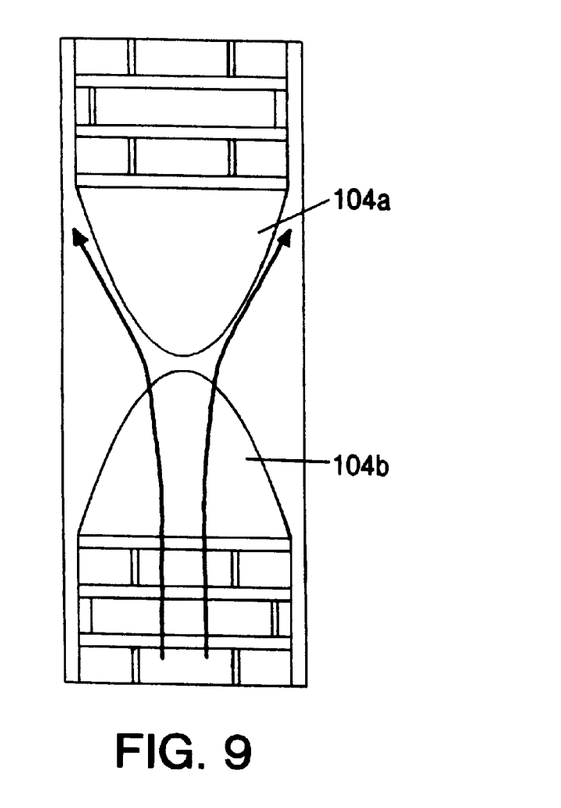
FIG. 9 is a view, showing a mixing flow passage of the coolant formed within the spacer grid by the dimple vanes of this invention.
Figure 10:
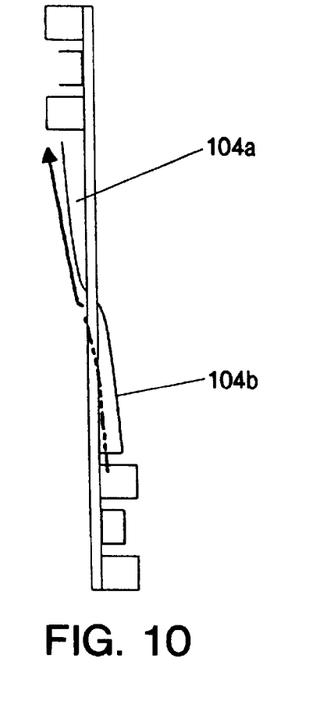
FIG. 10 is a view, showing an intersecting flow passage of the coolant formed within the spacer grid by the dimple vanes of this invention.

FIG. 9 is a front views, showing a mixing flow passage of the coolant formed within the spacer grid 101 by the dimple vanes 104a and 104b of this invention. As shown in the drawing, the coolant, introduced into the spacer grid 101 from the lower end of the grid 101, is diverged at a "Y" into two streams by the dimple vanes 104a and 104b. FIG. 10 is a side view, showing the flow passage of the coolant formed within the spacer grid 101 by the dimple vanes 104a and 104b of this invention.

Figure 11:
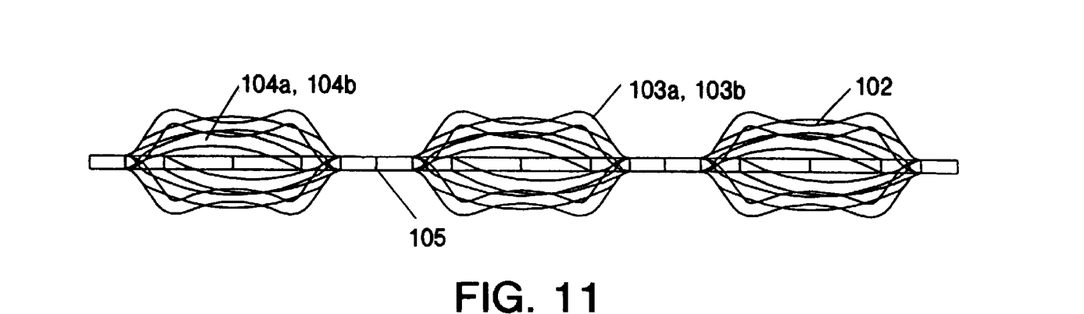
FIG. 11 is a plan view of an inside grid strip having the dimple vanes and multi-springs of this invention, designed to be used in a nuclear fuel assembly having a 3×3 array.

FIG. 11 is a plan view of an inside grid strip 105 designed to be used in a nuclear fuel assembly having a 3×3 array according to this invention. As shown in the drawing, the inside grid strip 105 has the dimple vanes 104a and 104b and multi-springs 102, 103a and 103b at regularly spaced three portions.

Figure 12A:
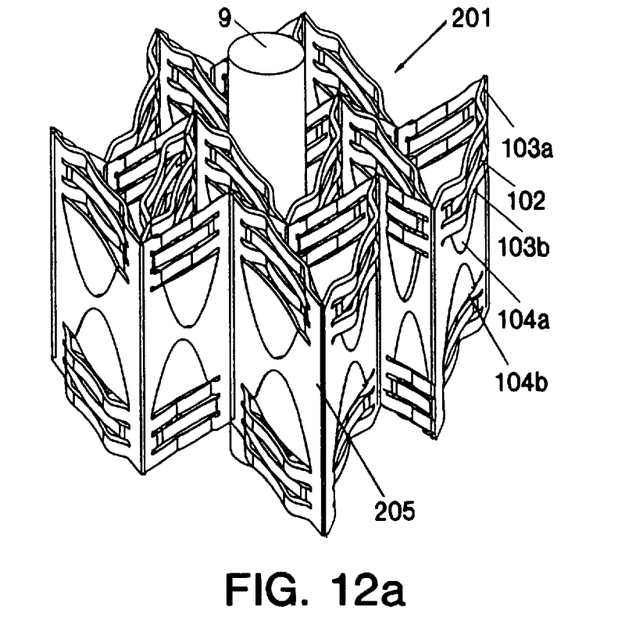
FIG. 12a is a perspective view of a spacer grid fabricated using a plurality of inclined strips having a plurality of dimple vanes and multi-springs in accordance with another embodiment of this invention and designed to be used in a nuclear fuel assembly having a 3×3 array.
Figure 12B:
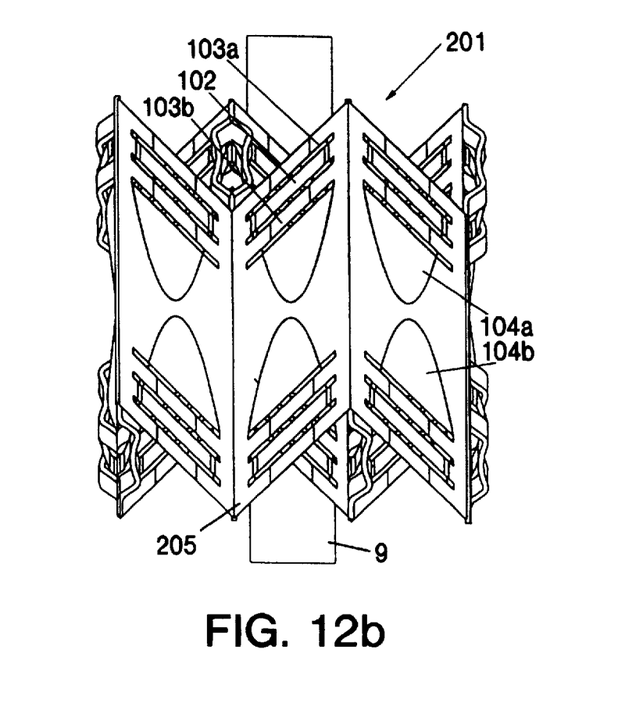

FIGS. 12a and 12b are views of a spacer grid 201 fabricated using a plurality of inclined strips 205 in accordance with the second embodiment of this invention and designed to be used in a nuclear fuel assembly having a 3×3 array. In this embodiment, the strips 205 are inclined at a desired angle of inclination, thus reducing the coolant intercepting area at the same height within the spacer grid 201 when the dimple vanes 104a and 104b and the multi-springs 102, 103a and 103b excessively drop the pressure within the spacer grid 201. This finally reduces the pressure drop within the fuel assembly.

In the spacer grid 101, 201 of this invention, the two dimple vanes 104a and 104b, formed on each grid strip 105, 205 at a position corresponding to each sidewall of each unit cell 101a, are oppositely embossed in an axial direction of the fuel assembly. Therefore, the dimple vanes 104a and 104b diverge the coolant, introduced into the spacer grid from the lower end of the spacer grid, at a "Y" into two streams, thus effectively mixing the coolant in addition to allowing the coolant to intersect within the spacer grid. The coolant mixing effect Within the spacer grid 101, 201 of this invention is thus improved.

However, a conventional structure, designed to improve the coolant mixing effect within the spacer grid, regrettably creates an excessive turbulent flow of the coolant within the spacer grid, thus vibrating the fuel rods and undesirably creating fatigue damage of the fuel rods. However, the dimple vanes 104a and 104b, formed in the spacer grid 101, 201 of this invention, accomplish a desired coolant mixing effect by changing the coolant flow passage within the spacer grid in place of creating such a turbulent flow. The spacer grid 101, 201 of this invention is thus free from such fatigue damage of the fuel rods 9 different from the conventional spacer grid.

On the other hand, the three springs 102, 103a and 103b, formed around each of the two dimple vanes 104a and 104b and used for supporting a fuel rod 9 within a unit cell of the spacer grid, form a multi-spring structure. Of the three springs 102, 103a and 103b, the two sub-springs 103a and 103b, positioned above and under the main spring 102, effectively support the fuel rod 9 when the main spring 102 fails to support the rod 9, thus accomplishing desired soundness of the fuel rod 9 within the spacer grid.

That is, the arc-shaped main spring 102, positioned at the middle of the three springs 102, 103a and 103b, normally supports the fuel rod 9. However, the main spring 102 may fail to effectively support the fuel rod 9 due to a reduction in the spring force, a difference of thermal expansion or a reduction in the fuel rod diameter. In such a case, the bow-shaped sub-springs 103a and 103b, positioned above and under the main spring 102, effectively support the fuel rod 9 and accomplish desired soundness of the fuel rod 9 during an expected life span of the rod 9.

In addition the multi-springs 102, 103a and 103b of this invention may be inclined at a predetermined angle of inclination relative to a grid strip 105 of the unit cell 101a. In such a case, it is possible to minimize the reduction in the coolant flowing area at the same height within the spacer grid. In the spacer grid of this invention, the two sub-springs 103a and 103b are designed to surround the fuel rod 9 at their support parts, thus effectively reducing the maximum stress acting on the contact junction between the sub-springs 103a and 103b and the fuel rod 9. The above-mentioned specifically designed shape of the sub-springs 103a and 103b also allows the sub-springs 103a and 103b to reliably support the fuel rod 9 regardless of a variation in an any directional external force or a variation in a pressure field.

The upper and lower edges 107a, 107b, 108 and 109 of both the multi-springs 102. 103a and 103b and the dimple vanes 104a and 104b are appropriately rounded, and so the multi-springs 102, 103a and 103b and the dimple vanes 104a and 104b are free from scratching or damaging the external surface of a fuel rod 9 when the fuel rod 9 is inserted into or removed from the spacer grid during a process of fabricating a nuclear fuel assembly.

As described above, the present invention provides a spacer grid with multi-springs and dimple vanes for nuclear fuel assemblies. In the spacer grid of this invention, two dimple vanes are formed on each grid strip at a position corresponding to each sidewall of each unit cell. The above dimple vanes are oppositely embossed so as to guide a part of the coolant from one cell to neighboring cells, thus effectively mixing the coolant within the spacer grid. The spacer grid of this invention thus improves the thermal allowance of the fuel rods and accomplishes a high performance nuclear fuel assembly.

In the spacer grid of this invention, the multi-springs may be inclined at a predetermined angle of inclination relative to the grid strips. It is thus possible to minimize the reduction in the coolant flowing area at the same height within the spacer grid. In addition, two sub-springs of the multi-springs are designed to surround a fuel rod, thus effectively reducing the maximum stress acting on the contact junction between the sub-springs and the fuel rod. The above sub-springs also reliably support the fuel rod and accomplish desired soundness of the fuel rods during an expected life span of the fuel rods. The upper and lower edges of both the multi-springs and the dimple vanes are appropriately rounded or angled, thus being free from scratching or damaging the external surface of the fuel rods when the fuel rods are inserted into or removed from the spacer grid during a process of fabricating a nuclear fuel assembly.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A nuclear fuel spacer grid fabricated by intersecting a plurality of grid strips and used for placing and supporting a plurality of elongated fuel rods at multi-points within a nuclear fuel assembly, comprising:

two dimple vanes formed on each of the grid strips at a position corresponding to each sidewall of a unit cell of said spacer grid, said two dimple vanes being oppositely embossed in an axial direction of the fuel assembly so as to accomplish a coolant mixing effect within the spacer grid;

two main springs provided on each of said grid strips at respective positions above and under the two dimple vanes, said main springs having an arcuate shape suitable for elastically supporting an elongated fuel rod within the unit cell; and two sub-springs provided on each of said grid strips at positions above and under each of the main springs, said sub-springs having a bow shape suitable for supporting the fuel rod while reducing a maximum load applied to the fuel rod within the unit cell.

2. The spacer grid according to claim 1, wherein each of said two dimple vanes has a streamline profile suitable for diverging the coolant flowing within the spacer grid in the axial direction thus allowing the coolant to be mix together while flowing within the spacer grid.

3. The spacer grid according to claim 2, wherein said two dimple vanes, formed on a sidewall of the unit cell, are opposite in their embossed directions to dimple vanes formed on neighboring sidewalls of the unit cell, thus allowing the coolant to be mixed together and to swirl within the spacer grid, said dimple vanes being also positioned on a reference surface at which the grid strip is cut at a predetermined angle so as to reduce a pressure drop.

4. The spacer grid according to claim 1, wherein said main springs and said sub-springs form a multi-spring structure, of which the main springs, having the arcuate shape directly, support the fuel rod, and the sub-springs, having the bow shape, support the fuel rod when the main springs fail to support the fuel rod.

5. The spacer grid according to claim 4, wherein said main springs and said sub-springs have a limited number of angled portions, thus being reduced in residual stress at the angled portions.

6. The spacer grid according to claim 4, wherein said main springs and said sub-springs arc inclined at a desired angle of inclination relative to the grid strip, thus reducing a coolant intercepting area at the same height within the spacer grid and reducing a pressure drop within the spacer grid, said main springs and said sub-springs and said dimple vanes being also designed to be almost free from reducing a coolant flowing area at a position around each fuel rod.

* * * * *